United States Patent
Boussemart et al.

(10) Patent No.: US 8,210,098 B2
(45) Date of Patent: Jul. 3, 2012

(54) BREWING DEVICE FOR CAPSULE WITH CLOSURE MECHANISM OF VARIABLE TRANSMISSION RATIO

(75) Inventors: Christophe S. Boussemart, Lugrin (FR); Christian Jarisch, Paudex (CH); Stefan Etter, Kehrsatz (CH)

(73) Assignee: Nestec S.A., Vevey (CH)

( * ) Notice: Subject to any disclaimer, the term of this patent is extended or adjusted under 35 U.S.C. 154(b) by 663 days.

(21) Appl. No.: 12/301,574

(22) PCT Filed: May 22, 2007

(86) PCT No.: PCT/EP2007/054903
§ 371 (c)(1),
(2), (4) Date: Apr. 23, 2009

(87) PCT Pub. No.: WO2007/135136
PCT Pub. Date: Nov. 29, 2007

(65) Prior Publication Data
US 2009/0308258 A1    Dec. 17, 2009

(30) Foreign Application Priority Data
May 24, 2006    (EP) .................................... 06114446

(51) Int. Cl.
*A47J 31/40* (2006.01)
(52) U.S. Cl. .................. 99/302 P; 99/289 R; 99/295
(58) Field of Classification Search ............... 99/289 R, 99/295, 302 P
See application file for complete search history.

(56) References Cited

U.S. PATENT DOCUMENTS

| | | | | |
|---|---|---|---|---|
| 6,490,966 | B2 * | 12/2002 | Mariller et al. | 99/289 R |
| 6,557,458 | B1 * | 5/2003 | Blanc et al. | 99/280 |
| 6,698,332 | B2 * | 3/2004 | Kollep et al. | 99/289 R |
| 7,318,373 | B2 * | 1/2008 | Blanc et al. | 99/302 P |
| 7,531,198 | B2 * | 5/2009 | Cortese | 426/433 |
| 7,703,380 | B2 * | 4/2010 | Ryser et al. | 99/295 |
| 2004/0011206 | A1 | 1/2004 | Versini | 99/323 |
| 2004/0182248 | A1 | 9/2004 | Fischer | 99/275 |
| 2005/0106288 | A1 | 5/2005 | Blanc et al. | 426/77 |

(Continued)

FOREIGN PATENT DOCUMENTS

CN    1638679    7/2005
(Continued)

OTHER PUBLICATIONS

International Search Report PCT/EP2007/054903 Dated Aug. 8, 2007.

*Primary Examiner* — Reginald L Alexander
(74) *Attorney, Agent, or Firm* — Winston & Strawn LLP

(57) ABSTRACT

A brewing device for the brewing of a capsule containing a beverage ingredient, the device including a main frame, a first capsule holding part, a second capsule holding part for at least partially holding the capsule mobile relative to the first capsule holding part in the frame and linked to the frame by a closing mechanism that includes knuckle joints; and a manual handle forming lever to activate via the closing mechanism the second holding part from the open position to the closed position and vice versa. The closing mechanism includes an additional force transmitting member associated with the handle and arranged to de-multiply the force applied by the handle on the knuckle joints that compensates for the increase of the force needed for closing the holding parts on the capsule.

23 Claims, 14 Drawing Sheets

U.S. PATENT DOCUMENTS

Figure 1:
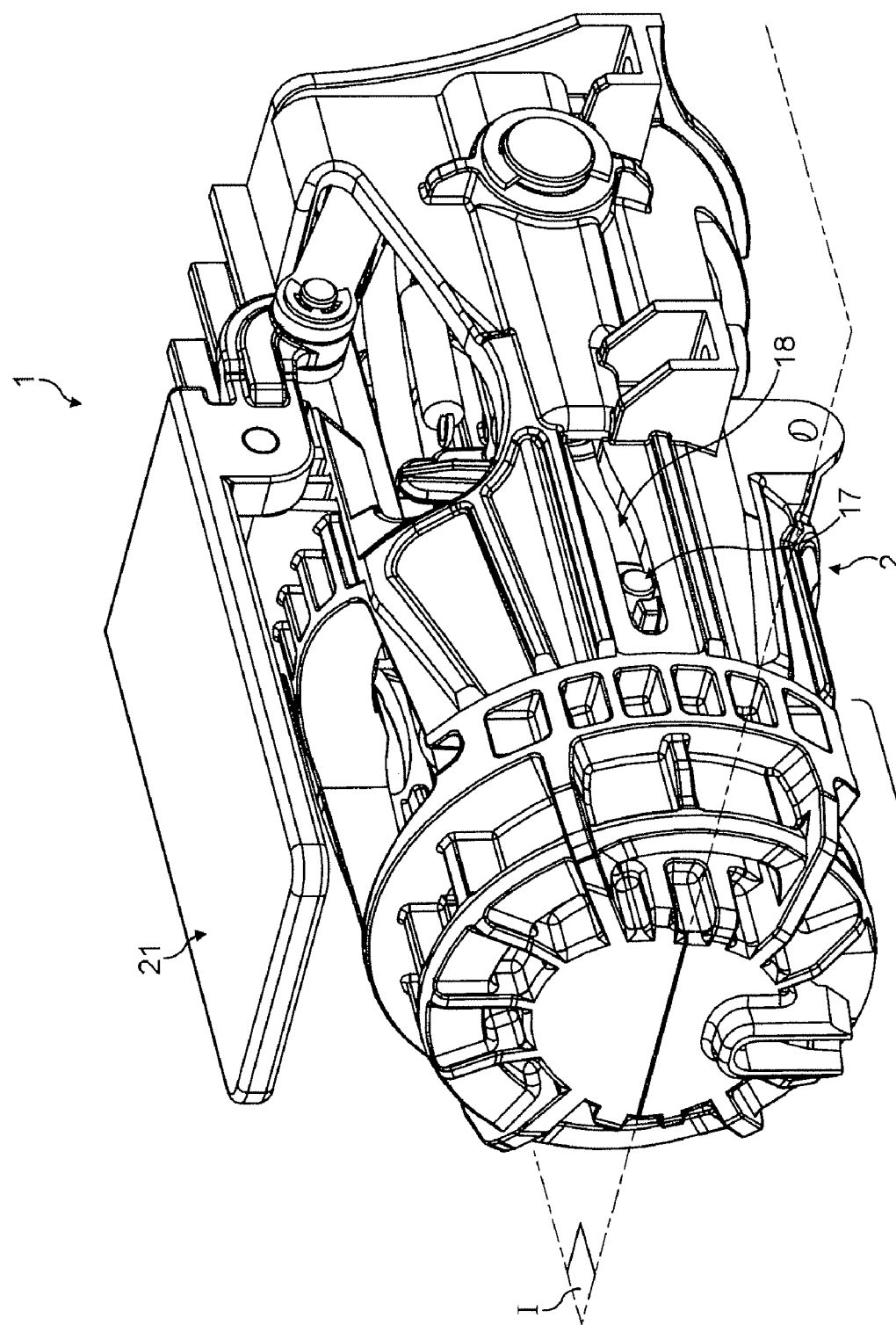

| | | |
|---|---|---|
| 2006/0230941 A1 | 10/2006 | Ryser et al. ............... 99/275 |
| 2009/0117249 A1 | 5/2009 | Ozanne et al. |

FOREIGN PATENT DOCUMENTS

| | | |
|---|---|---|
| EP | 0 564 399 A2 | 10/1993 |
| EP | 1 495 702 A1 | 1/2005 |
| EP | 1 674 007 A1 | 6/2006 |
| FR | 2 745 995 | 9/1997 |
| WO | WO 02/09563 A1 | 2/2002 |
| WO | WO 2005/004683 A1 | 1/2005 |
| WO | WO 2005/016093 A1 | 2/2005 |
| WO | WO 2006/066624 A1 | 6/2006 |

* cited by examiner

BREWING DEVICE FOR CAPSULE WITH CLOSURE MECHANISM OF VARIABLE TRANSMISSION RATIO

This application is a 371 filing of International Patent Application PCT/EP2007/054903 filed May 22, 2007.

The invention generally relates to a brewing device of a beverage or a liquid comestible adapted to handle a capsule containing ingredient(s) which is able to produce a beverage or liquid comestible when interacting with a liquid, such as for example, hot pressurized water, introduced into the volume of the capsule.

Especially in the field of coffee machines, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the waste one.

WO 2005/004683 relates to such a brewing device which comprises:
- a frame,
- a fixed holding part for the capsule,
- a mobile holding part; said part being mounted relative to the frame in a sliding relationship,
- a knuckle joint mechanism that provides a mechanical system which enables to close in a steady and fluid-tight manner the holding parts about the capsule while also resisting to the counter-force acting in re-opening and generated by the internal brewing pressure; and
- a handle for directly levering the knuckle joint mechanism.

Such a device provides a simple assembly enabling insertion of the capsule by vertical fall through a passage in the frame and removal of the waste capsule in the same direction as the insertion direction.

Although such device is easy to use and reliable, there are still a few disadvantages. In particular, the device may be relatively hard to close by the lever and/or may not be compact enough. Compactness depends on several technical factors and constraints which are necessary for a proper functioning of the device. The closure cinematic is such that a relatively long lever is needed to transfer a force sufficient to close the knuckle joint mechanism from the manual force exerted by the user on the lever. The manual force depends on the setting of the closing forces of the knuckle joint mechanism which depends on the tightening force exerted about the capsule to provide a fluid tight and pressure resistant system. Therefore, in order for the manual force to remain acceptable, the lever arm must be increased so to exert the necessary torque on the knuckle mechanism. Furthermore, the length of the lever necessitates to position the lever at the rear of the device which is so not optimal since it requires the user to extend his arm to grab the lever from a point relatively remote from the front of the machine and to describe a large arc of circle to close the device. The available room might not be sufficient (in particular in cramped kitchens) to accommodate such design of device or to carry out a comfortable operation of the machine.

In certain systems, the closure forces must also be sufficient to enable a side of the capsule to be perforated. For instance, the entry side of the capsule is perforated during closure to allow the introduction of the injection fluid in the capsule after closure. The forces required to pierce the capsule can be relatively important when the ingredient is in a compacted form in the capsule rather than in a loose form. The material the capsule is made of also influences on the required closure forces of the device. Therefore, the increase of the force required for piercing the capsule, in particular, those containing a compacted substance, imposes a greater effort on the handle by the user at a level which is not acceptable. Therefore, there is a need for reducing the effort on the handle while providing the required force to pierce the capsule correctly during closure of the device about the capsule.

Furthermore, the known device is linked to a water line that needs to be both flexible and long enough to compensate for the displacement of the mobile holding part during closure/opening cycles. The water line extension thus requires a relatively large internal volume of the frame to avoid the line to be squeezed or bent which could cause water flow disruption or flow rate control issues.

In view of the above problems, it is an object of the present invention to propose a device that, according to several possible embodiments, requires relatively less manual closure force for a same lever arm or requires a smaller lever arm for a same force for closing the brewing parts in a steady way about the capsule.

There is a need for a device that provides also high closure forces on the capsule to pierce and/or provide a sufficiently tight seal engagement in the device while not impacting on the ease of closing and at a level of manual effort which remains acceptable for the user.

There is also a need for a simple and low cost device without affecting the technical constraints, in particular, the need for relatively high closing forces.

There is a need for a device that can be built in a more compact design while keeping the closing efficiency and reliability of the existing brewing device, in particular, while providing a fluid-tight and pressure resistant closure.

These objects are achieved by means of the features of the independent claims. The dependent claims develop further the central idea of the present invention.

A first aspect of the invention so relates to a brewing device for the brewing of a capsule containing a beverage ingredient comprising:
- a main frame,
- a first capsule holding part,
- a second capsule holding part for at least partially holding the capsule; said capsule holding part being mobile relative to the first capsule holding part in the frame and linked to the frame by a closing mechanism comprising knuckle joint means to move from an open position at which the two parts are distant one another to enable the insertion of the capsule between the two parts and a closed position at which the first and second holding parts are closed about the capsule;
- a handle forming a lever means arranged to activate via the closing mechanism the second holding part from the open position to the closed position and vice versa, characterized in that:

the closing mechanism comprises additional force transmission means associated to the handle arranged to de-multiply the force applied by the handle on the knuckle joint means that compensates for the increase of the force needed for closing the holding parts on the capsule.

In a first mode, the force transmission means comprise additional force levers adapted to demultiply the force of the handle onto the knuckle joint means.

This configuration offers the opportunity for a more compact design. Since less force is required for a same lever arm, the manual handle can be shortened and positioned in a more effective and convenient manner.

In a possible mode, the knuckle joint means is composed of at least one pair of rods, preferably, two pairs of rods placed in parallel, which are linked on a first end to the mobile holding part and the other end fixed in rotation to the frame. The second end of the said at least one pair of rods is also linked in rotation to the force transmission means instead of being linked in rotation to the handle directly. As a result, an angle unit (i.e., a delta A of 1 degree) in the angular course of the lever will transfer the effort to a smaller displacement of the knuckle joint means at the end of the angular course of the handle; (i.e., where the "hard point" of the knuckle joint means must be overcome), than at the beginning of the angular course. This results in less manual efforts to be engaged on the handle when the hard point is overcome; therefore, providing the opportunity of reducing the lever arm as compared to the existing systems of given torque.

In a mode, the handle is placed in a position relatively above and forward the rear transmission point that is fixed to the frame. This configuration has been found more efficient for the proper transmission of the efforts via the force transmission means while participating at the same time to a compact brewing design. Indeed, the force transmission means extends substantially above the knuckle joint means between it and the handle; therefore, acting by force de-multiplication on the knuckle joint means without taking too much additional space. The handle describes a smaller arc-shaped path during operation and it also becomes more accessible to the user.

Preferably, the handle is also articulated to the upper of the frame. Again this participates to the effectiveness of the engaged forces and to the ergonomics of the device.

Furthermore, the handle can be shorter in length than the length of the assembly formed by the second holding part and the knuckle joint means when in extension in the closing position. In particular, the handle can be shorter than the length of the assembly without detriment to the ease of closing the device by an adult user. For instance, the handle can be 25% shorter or more.

For instance, the force transmission means are configured in relation to the handle and knuckle joint means so that the at least 50 last percent of the handle's course is utilized to displace the course of the knuckle joint means of about or less than the last 20%, more preferably less than the last 10%.

The course of the knuckle joint means is determined hereby as being the transversal or "vertical" distance travelled by the knee point with respect to a centre line passing through the two axis of the rotating ends of the rod means.

Preferably, the brewing device of the invention is oriented for being able to perform easy insertion and removal or ejection of the capsule. For this, the second holding part is arranged to slide in a substantially horizontal direction within the frame. The device can further comprise a passage adapted for the vertical fall of the capsule between the two holding parts. Therefore, the insertion of the capsule can be carried out in a manner similar to a moneybox. Capsule retaining means are also provided between the two holding parts to retain the capsule in a predefined position before closure. These retaining means can be identical to the solutions described in WO 2005/004683.

In another preferred embodiment of the invention, the brewing unit for the brewing of a capsule containing beverage ingredients comprises a frame and a first and second capsule holding members for at least partially enclosing the capsule during brewing. The first holding member can be mobile along the frame between an open and a closed position in relation to the second holding member. A closing mechanism is provided to actuate the first holding member between the two positions comprising an actuation member. The closing mechanism comprises gear means able to transfer the torque provided by the actuation member into translational closure forces on the first holding member.

Preferably, the gear means is arranged so that the transmission rate varies progressively during rotation therefore enabling to compensate for the increase of the force required to pierce and/or tightly enclose the capsule by the holding parts.

The gear means can comprise a pair of spur gears having non-circular transversal sections. In particular, each spur gear has a longer transversal radius and the respective transversal radiuses are positioned in intermeshing relationship at about 90 degrees one another.

The actuation member is preferably a handle or, alternatively, can be motor with a drive shaft. Another advantage of the invention can be indeed to offer the opportunity to reduce the effort to be exerted by a motor for a motorized brewing device; therefore making significant savings on the motor cost and/or energy consumption.

In another aspect of the invention, the brewing device for the brewing of a capsule containing a beverage ingredient comprises:
    a main frame,
    a first capsule holding part,
    a second capsule holding part for at least partially holding the capsule; said capsule holding part being mobile relative to the first capsule holding part,
    water supply means connected to second holding part configured to inject water in the said part,
    characterized in that:
    the water supply means comprises a length compensatory tube portion which is fixed relatively to the frame whereas the second holding part can move with respect to said length compensatory tube portion.

Therefore, the length compensatory tube portion of the water supply means, that is necessary to compensate for the relative movement of the holding portion from the closed to the opening position of the device, is meant to remain in a relatively static configuration. Such a configuration of the water supply means enables to eliminate the volume necessary to absorb the displacement of the tube during opening of the device. The length of the tube may also be significantly reduced. The water tube is less submitted to mechanical stresses such as repeated flexure bending or torsions that may affect the brewing conditions (pressure, flow rate, temperatures, . . . ) and therefore its lifetime is improved.

More particularly, the length compensatory tube portion is mounted relatively to the second holding part so that it inserts itself at least partly in the holding part as the holding part moves to the open position. The length compensatory tube portion can slide at least partially in a passage of the capsule holding part as said holding part moves toward its opening position. The passage can be formed of a hollow metal tube that is part of or connected to the holding part and can guide the portion of tube in sliding engagement while reducing the mechanical stresses on the portion of tube itself. In a possible mode, a portion of the compensatory tube moves inside the holding part to assist in ejecting the capsule from the holding part when the holding parts are opened. Further advantages, features and objects of the present invention will become evident from the following detailed description of preferred embodiments of the present invention in conjunction with the figures of the enclosed drawings.

Figure 2:
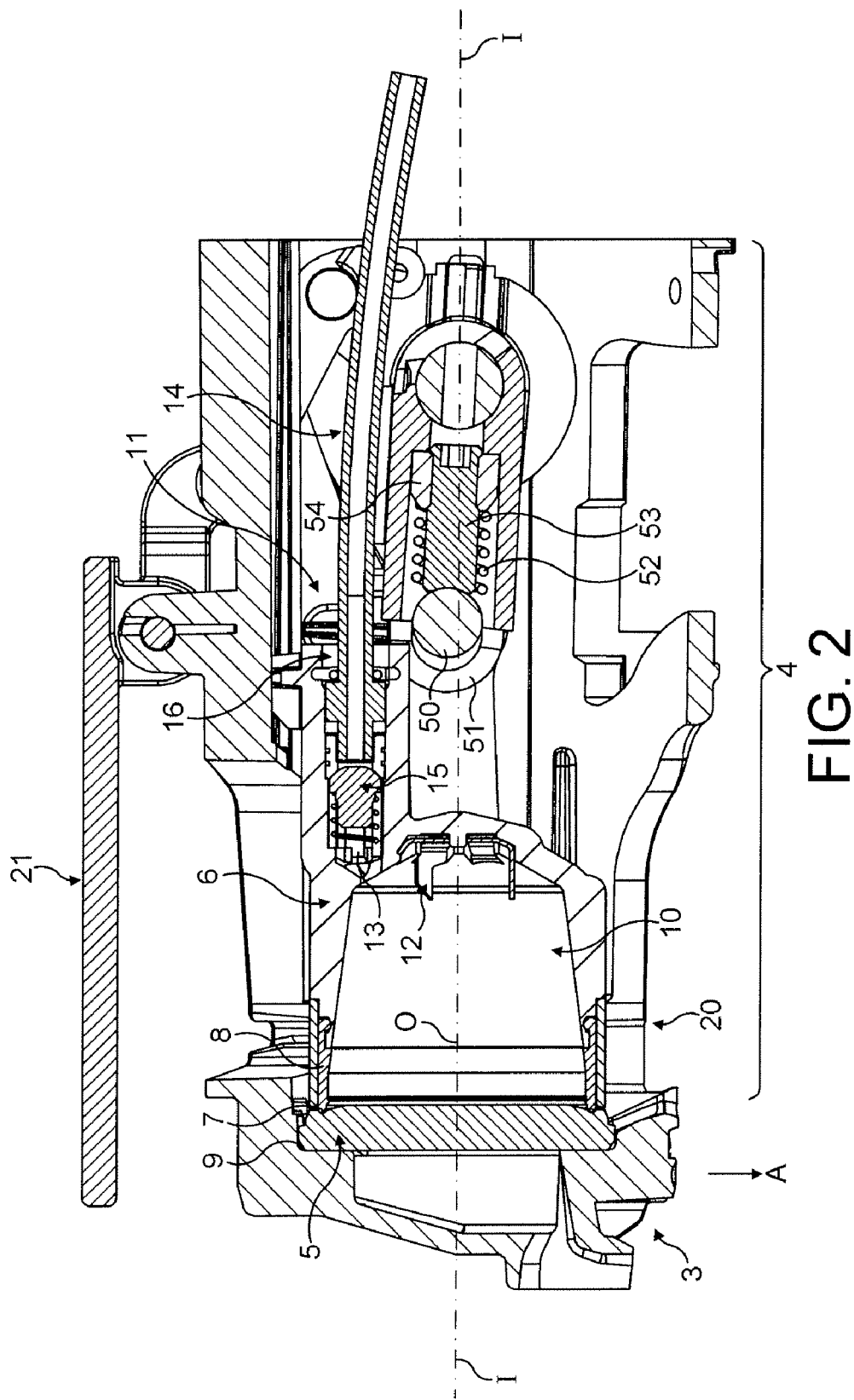
Figure 3:
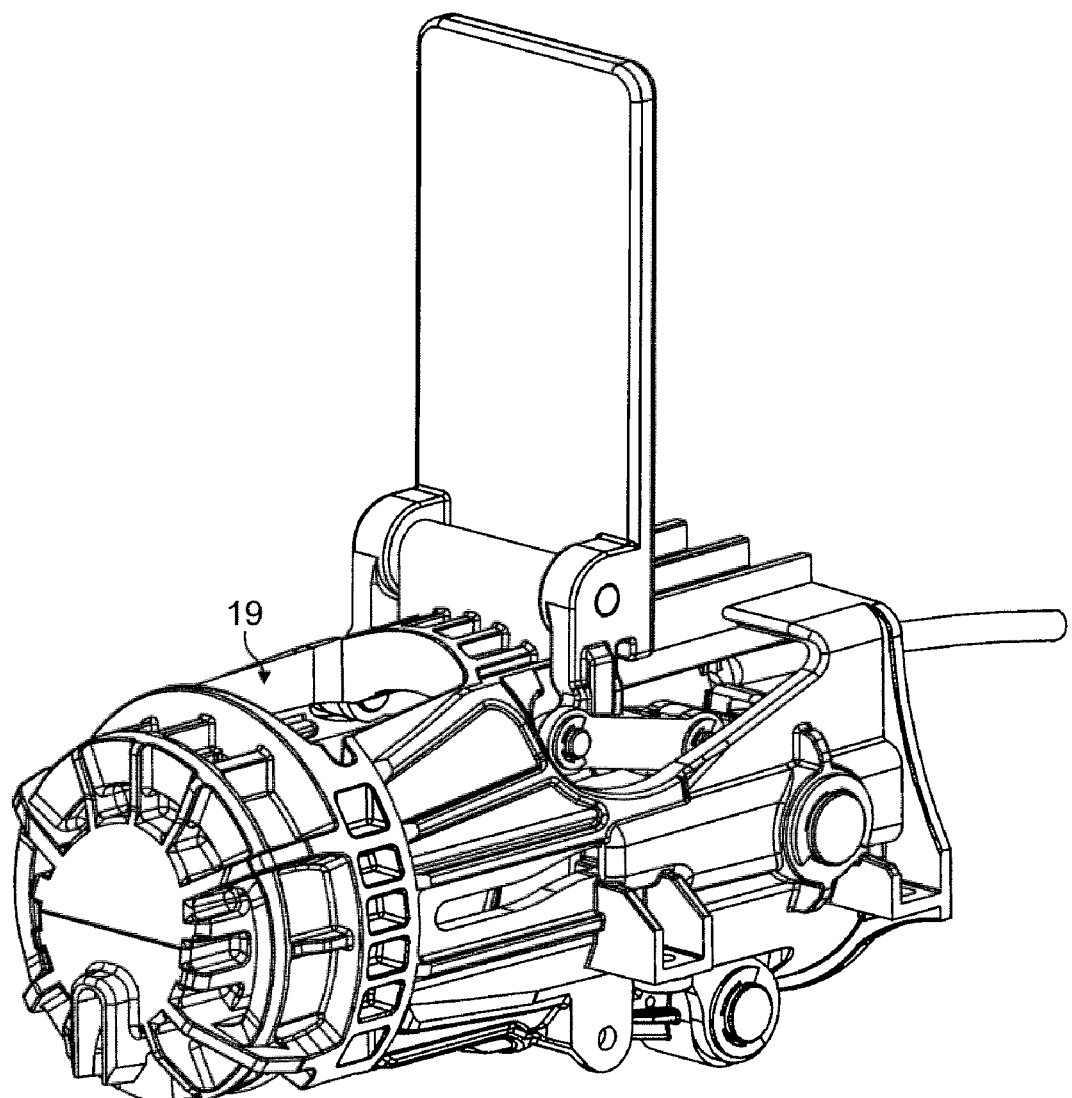
Figure 4:
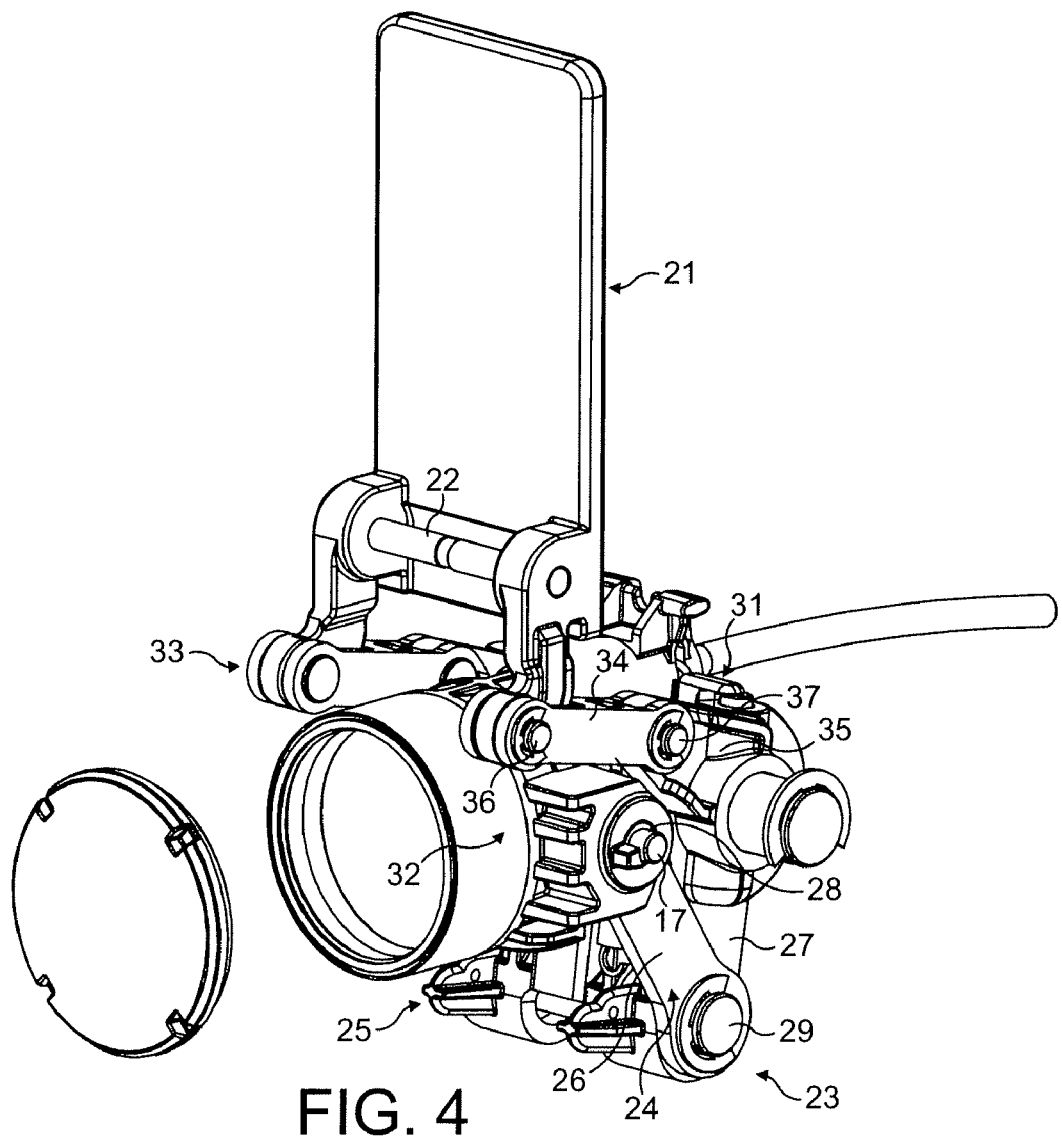
Figure 5:
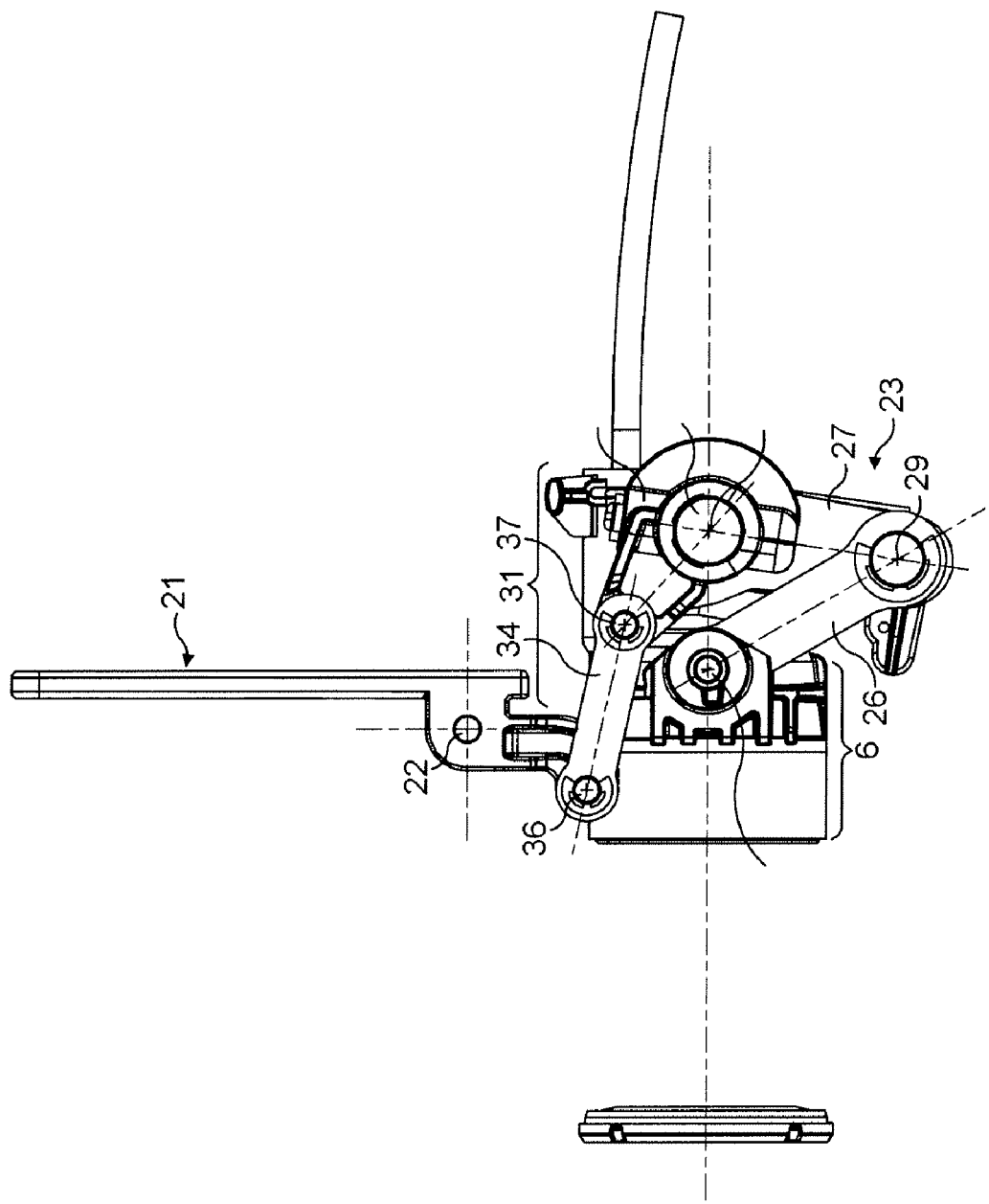
Figure 6:
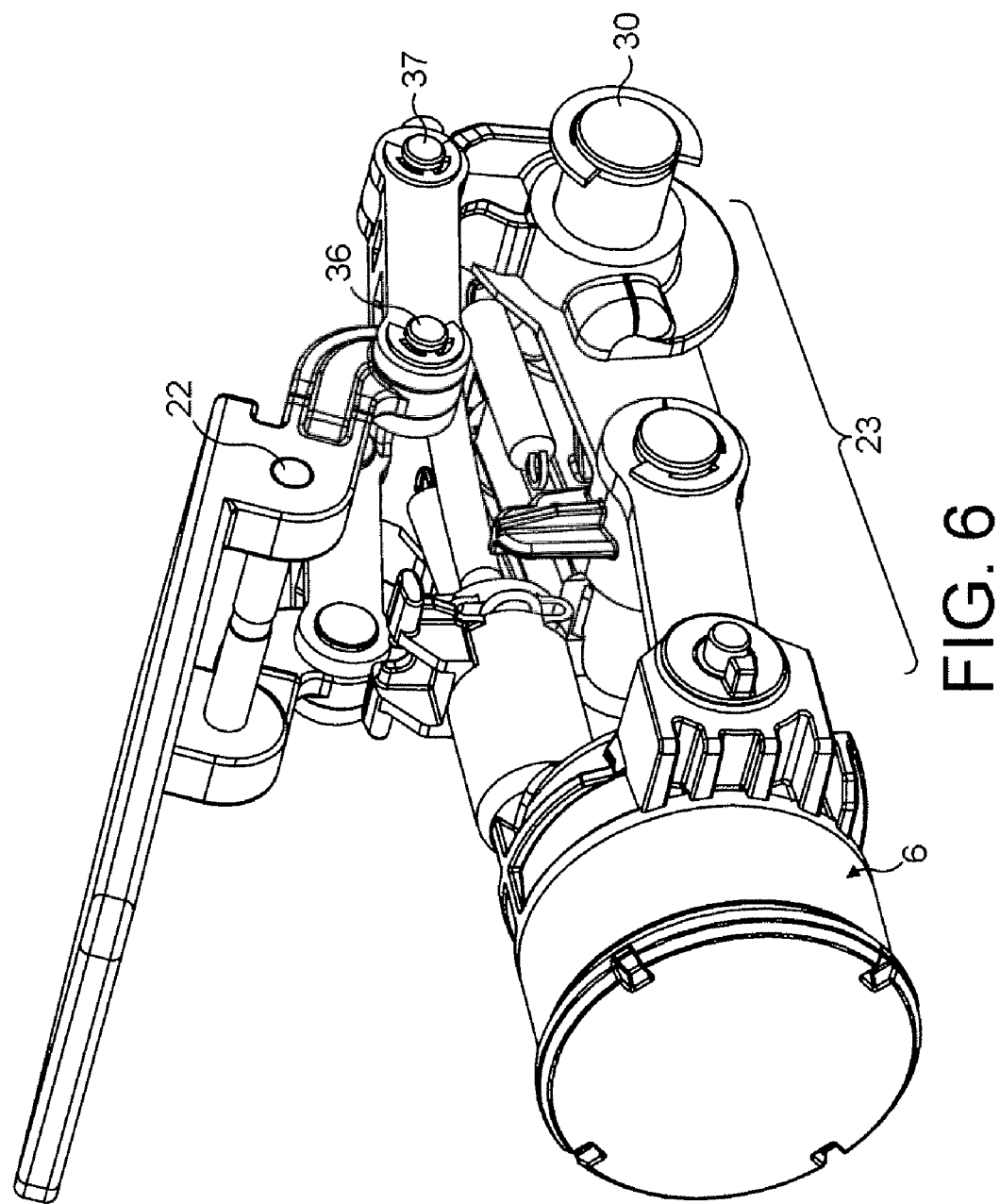
Figure 7:
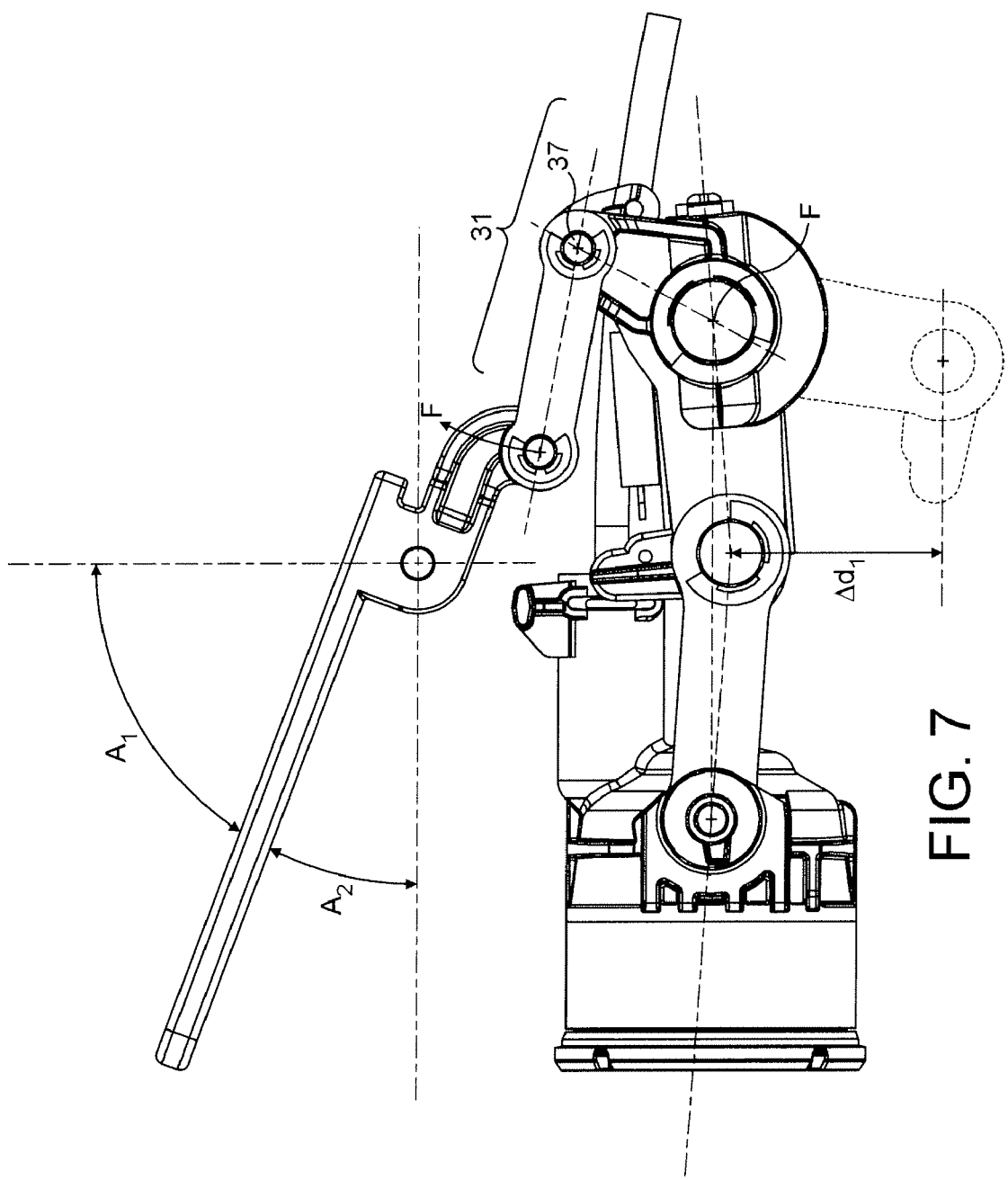
Figure 8:
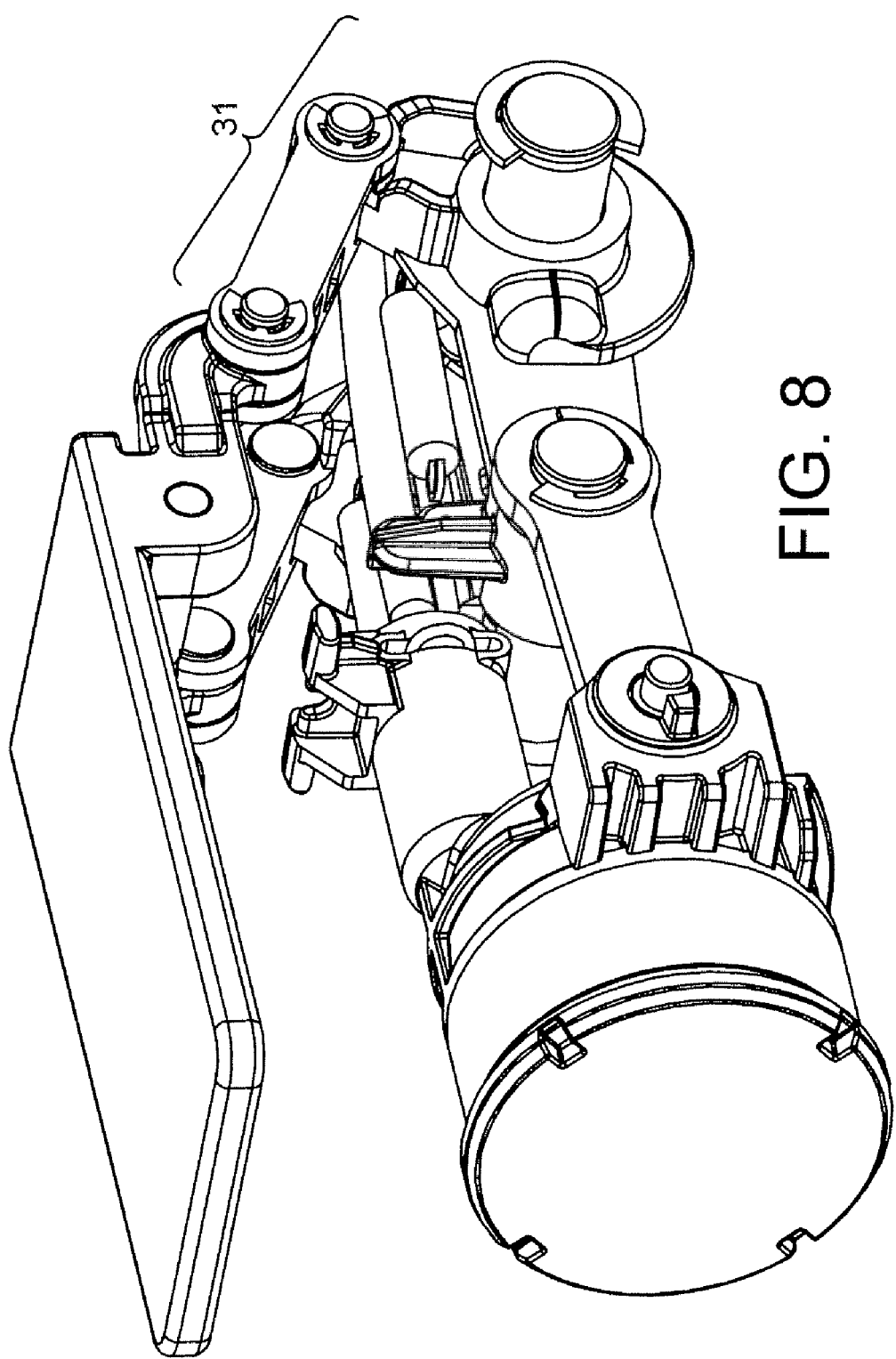
Figure 9:
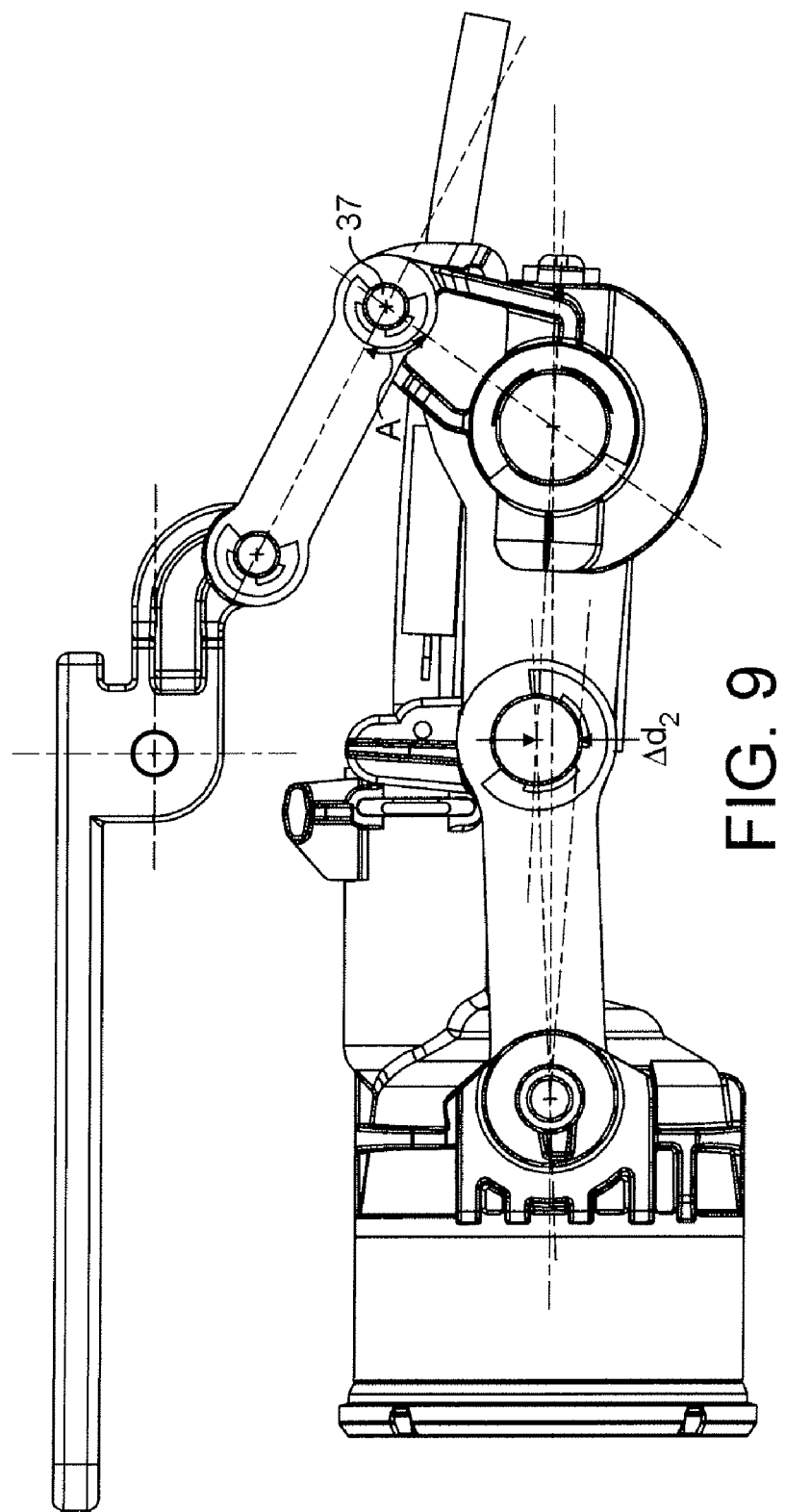
Figure 10:
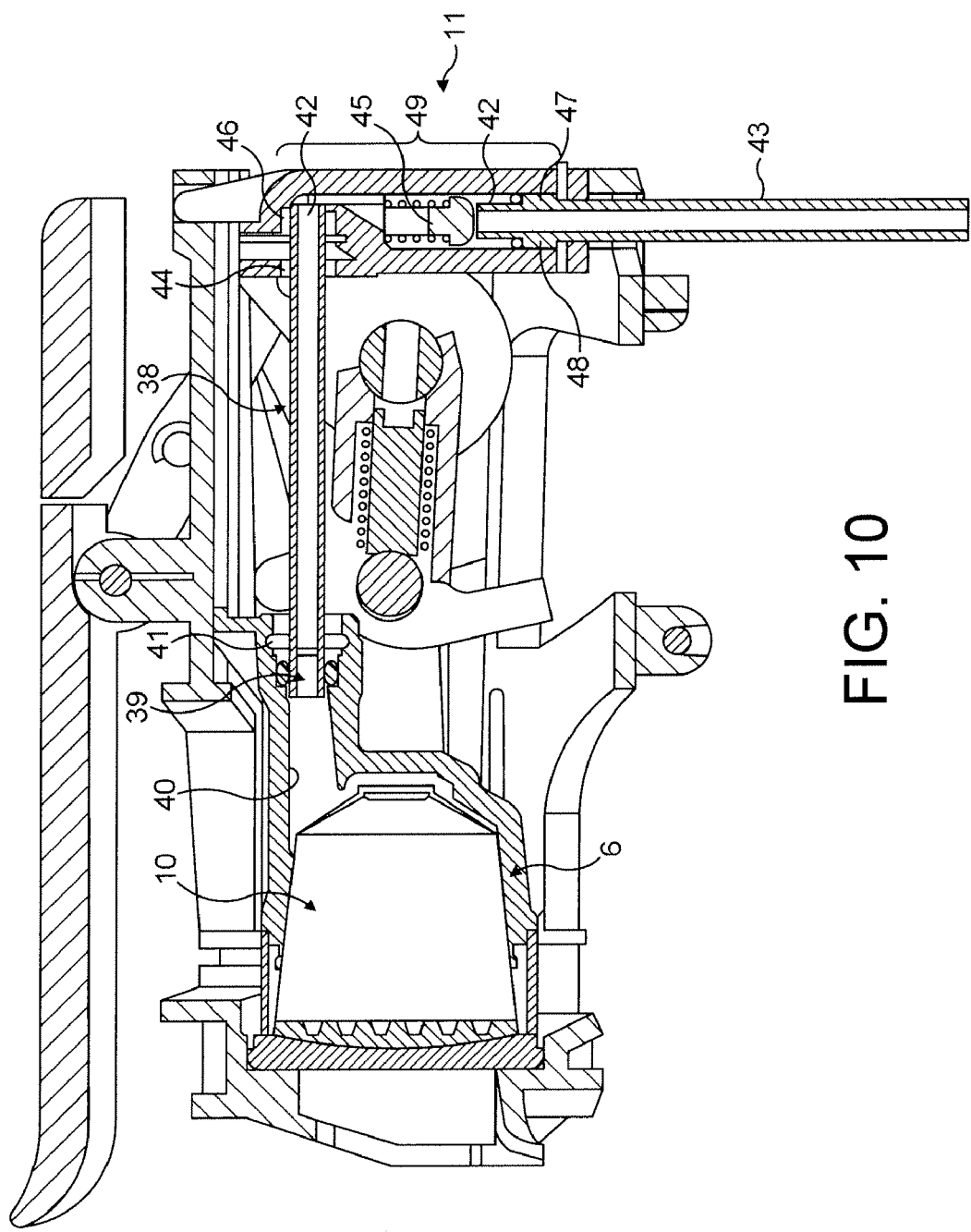
Figure 11:
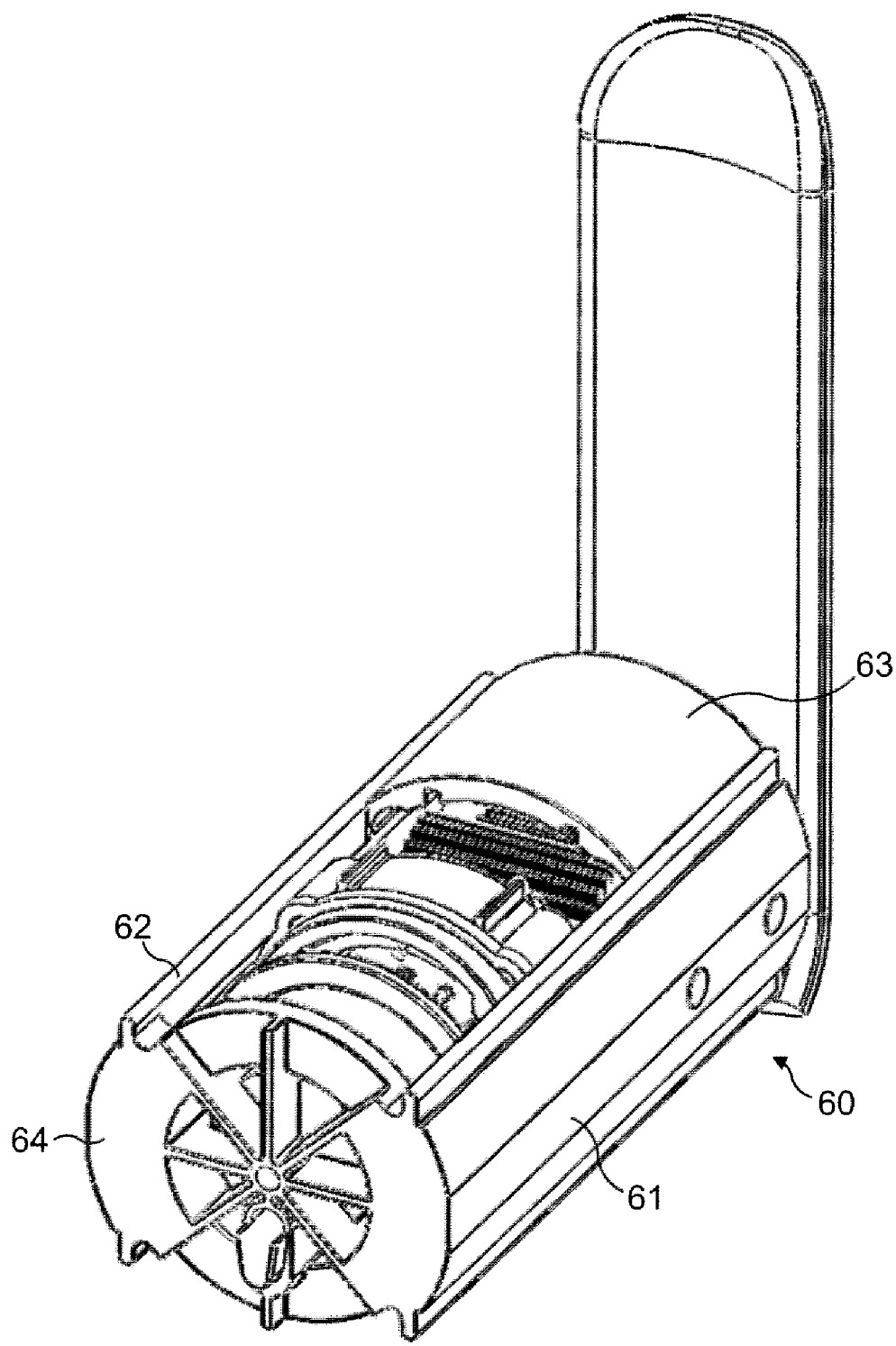
Figure 12:
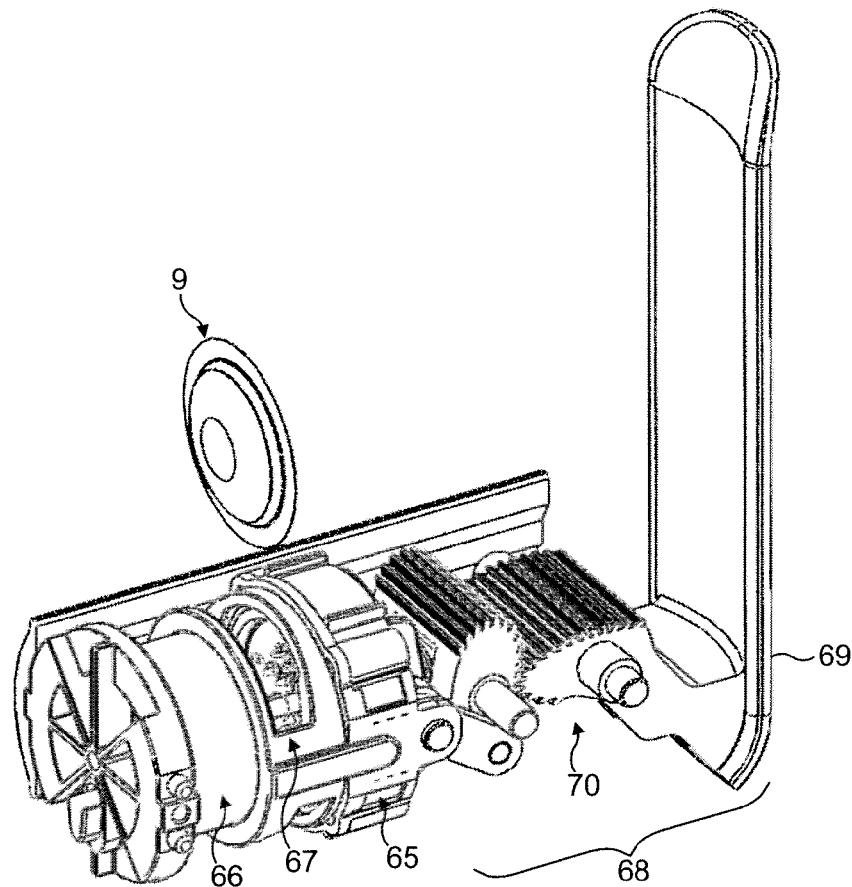
Figure 13:
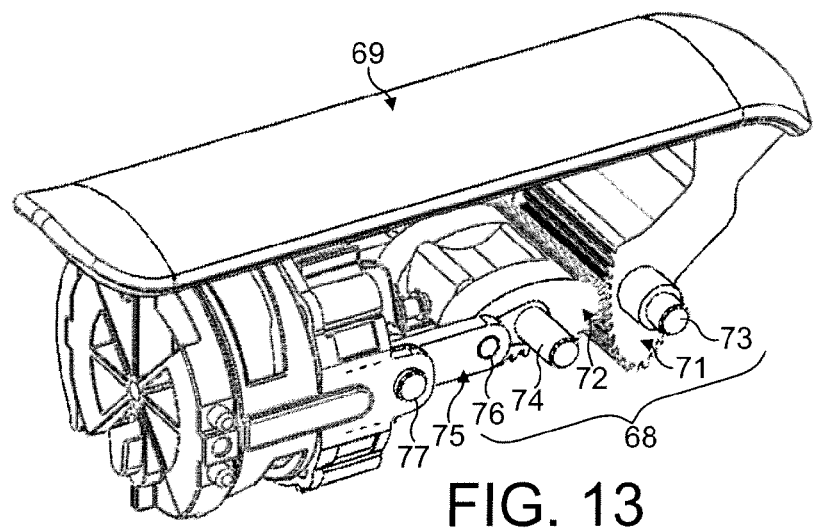
Figure 14:
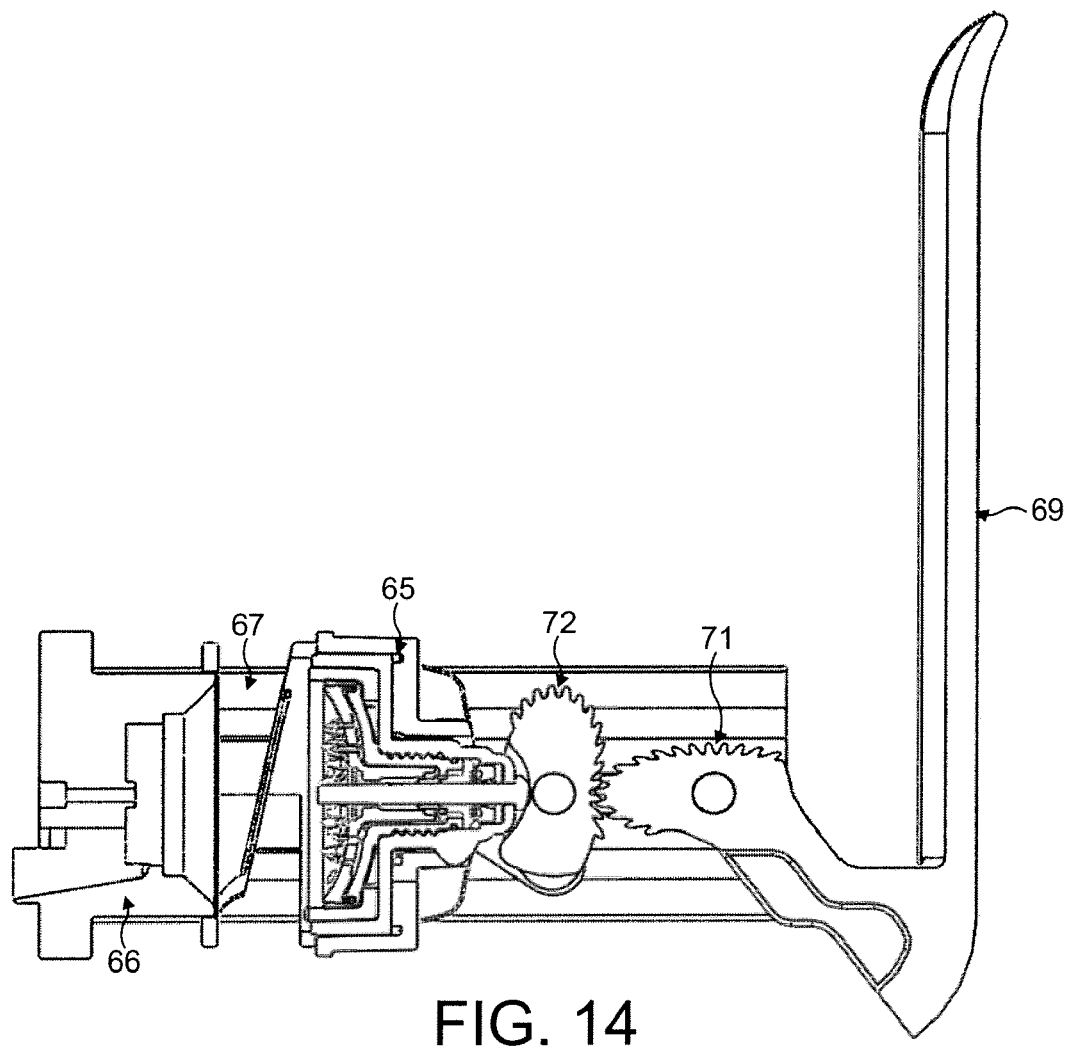
Figure 15:
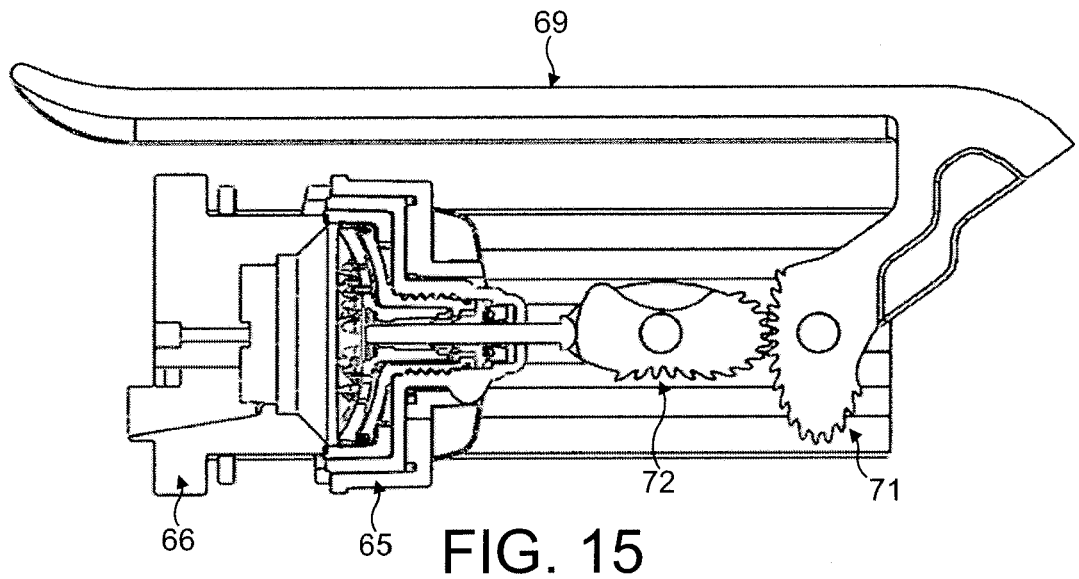
Figure 16:
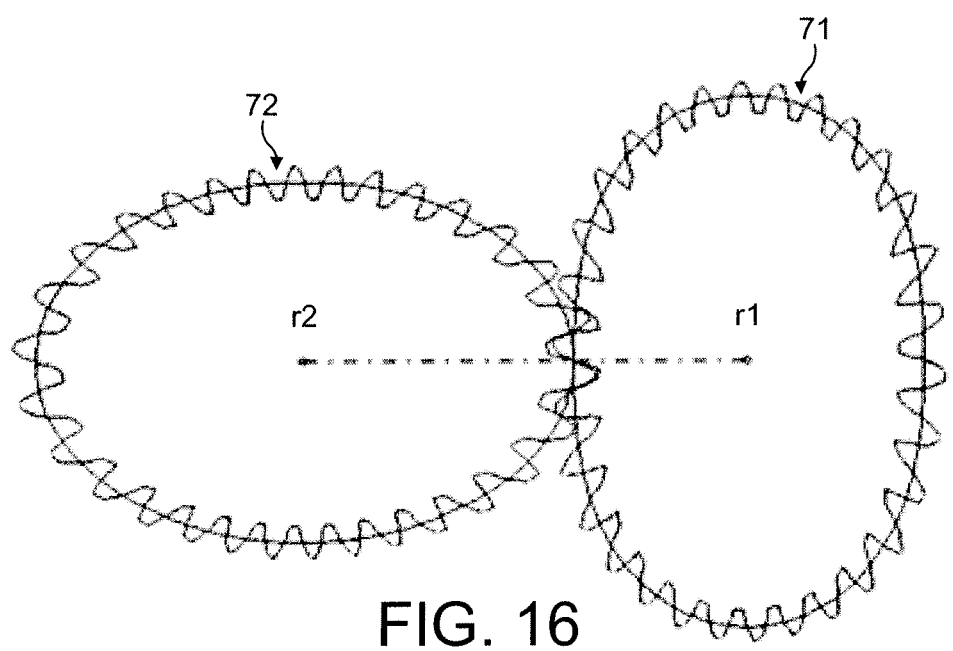

FIG. 1 shows in perspective a brewing device for a beverage production machine according to a first mode of the present invention, FIG. 2 shows a cross sectional and longitudinal view of the brewing device of FIG. 1, FIG. 3 shows in perspective the brewing device of FIGS. 1 and 2 but in open position, FIG. 4 shows a simplified perspective view of the brewing device without the frame and in open position, FIG. 5 is a side view of FIG. 4, FIG. 6 shows a simplified perspective view of the brewing device in intermediate position, FIG. 7 is a side view of FIG. 6, FIG. 8 shows a simplified perspective view of the brewing device in closed position, FIG. 9 is a side view of FIG. 8, FIG. 10 shows a cross sectional view of a variant of the invention comprising the fixed compensatory tube means, FIG. 11 shows a perspective view of a brewing device according to another embodiment of the invention in the open position for inserting a capsule therein, FIG. 12 shows the embodiment of FIG. 11 in perspective view with the sidewall removed, FIG. 13 shows a perspective view with the sidewall removed of the brewing device of FIG. 11 in closed position, FIG. 14 shows a side view taken along a median vertical plane of the brewing device of FIG. 11, FIG. 15 shows a side view taken along a median vertical plane of the brewing device of FIG. 11 in closed position, FIG. 16 shows a schematic view of the variable transmission rate of the gear means of the embodiment of FIGS. 12 to 15.

Before referring in detail to the figures of the enclosed drawings, the following definitions are given for clarity:

The term "beverage" encompasses both drinkable liquids and liquid comestibles such as (but not limited to) soups and the like.

The term "capsule" is any receptacle enclosing a beverage ingredient in dry, liquid, solid or other form. The capsule can have a hard envelope or a soft envelope. It can be made of a same material or of different materials. It can be hermetically sealed (e.g., an aluminium body and membrane) or not (e.g., partially or totally porous).

The term "brewing" and "brewing device" refers to, respectively, all kind of interactions between a liquid and ingredients, such as pressure extraction, mixing, dissolving, infusing, etc., and technical modules as part of a beverage machine capable of handling a capsule to provide the brewing process.

The spatial relationship of the brewing device can also be changed without departing from the scope of the invention. In particular, although the brewing device is described in a horizontal arrangement and references are made to "front" and "rear directions" for the ease of comprehension; the device could be arranged in other spatial configuration, i.e., vertical or inclined.

FIGS. 1 and 2 show an overview of a first embodiment of the brewing device or module of the present invention.

The brewing device for a capsule can be integrated in different beverage production machines, especially coffee machines. It can constitute an independent module, which only needs to be connected to a supply and for pressurized water (supplied e.g. from a pump connected to a thermoblock, boiler or another type of heater).

The brewing device 1 of the invention comprises a main frame 2 generally made of a durable material such as aluminium, stainless steel, copper or hard plastic or combinations thereof. The frame extends on the front of the device by a beverage delivery outlet 3 and on the rear of the device by a housing 4 of substantially tubular configuration. The frame thus extends substantially horizontally along median horizontal plane I. The delivery outlet includes an internal channel that is configured for collecting the beverage and for delivering it downwards in direction A.

The device further comprises capsule holding portions, respectively, a first or front holding portion 5 and a rear holding portion 6; both of which cooperate together to hold the capsule in place during the brewing process. The holding portions 5,6 are further configured to form an enclosure at the water injection side of the capsule; thereby allowing water entering the enclosure to interact with the ingredient in the capsule. The enclosure is preferably fluid tight along the peripheral edges 7 of the portions; fluid tightness being obtained by a sufficient force of the rear holding portion 6 abutting on a rim of the capsule and pressing it toward the edge of the front holding portion. For proper sealing, a joint 8 can be provided on the rear holding portion 6 or as part of the capsule itself as described in pending European patent application No. 04025320.5.

The rear holding portion can be a plate having protruding elements that tears or punctures a membrane of the capsule when a sufficient pressure has been built inside the enclosure. The beverage can be drained through channels and holes performed in the plate itself and/or at the surface and/or side of the plate. Other brewing principles are possible such as pre-opening the delivery side of the capsule and filtering the beverage via a filter in the plate, for instance.

The front holding portion 5 is preferably fixed in the frame, for instance, it is fixedly inserted in a ridge 9 formed between the delivery outlet 3 and the housing 4.

The rear holding portion 6 has the form of a cage with an internal cavity 10 that encompasses the body of the capsule and is associated with water supply means 11 arranged to inject water in the cavity and consequently in the capsule forming with the cavity, the fluid tight enclosure. In the bottom of the cavity 10, are lodged piercing elements 12 such as blades for opening the capsule and allowing pressurized water to enter the capsule. Water can be injected at any point in the cavity such as on a side or in the bottom via a water inlet 13. The water supply means further include tube means 14 to transport water from a heater to the inlet, a backpressure valve 15 to control the pressure in the device and avoid backflow and a sealed connector 16.

The rear holding portion 6 is mobile in the frame 2 to be able to move from an opening position allowing the capsule to be inserted between the two portions 5, 6 and a closed position for brewing the capsule. The holding portion can move along a closing path from the opening to the closed position that is not necessarily fully linear. Preferably, the path is not fully linear. In particular, the closing path has a first portion that is slightly offset in respect to the centre line O that passes through the centre of the front holding portion. It has a second portion that is centred along centre line O. The variation to a pure linear movement of the closing path has the function to move the capsule from an off-centred position of insertion to a brewing position. The capsule is retained in pre-position via retaining means that can be forced during closure of the holding portions. When the holding parts are re-opened, the capsule being no longer retained by the retaining means can fall down by gravity. Such a mode of insertion and pre-positioning of the capsule has been already described in full detail in WO 2005/004683 A1; the content of which is part of the present description, at least concerning the description of the solution for retaining the capsule during closing (i.e., page 2, lines 36 to page 7, lines 26).

For guiding the holding portion in the closing path, the holding portion includes, for instance, side pins 17 protruding outwards and being guided along longitudinally oriented grooves 18 provided along the side of the housing. The grooves are formed with a first (rear) and second (front) portions; with the first portion being slightly offset relative to the centre line of the holding portions in the closed state of the device.

As also apparent in FIG. 3, the frame is provided with an upper passage 19 arranged to receive the capsule. The profile of the passage 19 can be adapted to the capsule shape to be received in the correct insertion side. As apparent in FIG. 2, the frame also comprises a lower passage 20 for discarding of the waste capsule once the brewing process is over and the rear holding portion is re-opened. As already mentioned, the capsule falls down by gravity as it is no longer retained by capsule retaining means when the rear holding portion re-opens.

The kinematic closing arrangement of the brewing device that constitutes a central idea of the invention will now be described in relation to FIGS. 4 to 9.

First of all, the brewing device is intended to be closed manually by a handle 21 that is positioned on the upper side of the device and is articulated in rotation along an axle 22 fixed to the upper side of the frame.

The rear holding portion is associated to a knuckle joins mechanism 23 which is known 'per se'. Such a mechanism enables to move the holding portion 6 and to lock it steadily in place by a "knee" effect once a "hard point" has been overcome which corresponds to the extension of the mechanism in a slightly reversed angular configuration relative to the its folded position. For this, this mechanism comprises preferably two pairs 24, 25 of rods 26, 27. The two pairs are placed in parallel on each side of the holding portion in order to offer a high resistance to the torsion efforts. The first or front rods 26 are attached on the front end axle 28 on the side of the rear holding portion 6 and on the other end at a free pivot axle 29 to the second or rear rods 27 of the knuckle joins mechanism. The second rear rod 27 is then attached by a rear end axle 30 to a force transmission means whose structure and function will be described just next. The two rods 26, 27 are so attached along a free pivot axle 29 which has the ability to move vertically and horizontally as the front and rear axles 28, 30 are moved away during closing of the brewing device. It can be noticed that both front and rear axles 28, 30 are, respectively, guided and linked to the frame whereas pivot axle 29 is not. Front axle 28 protrudes by the side pin 17 in the side groove 18. Rear axle 30 is static relative to the frame enabling to take the reaction forces when the holding portion is pushed forward to the front holding portion.

As apparent in FIG. 2, a force control system of the knuckle means is provided to enable to compensate for the manufacturing tolerances and precisely control its closure force. For this, the two rods 26, 27 are attached by a connection axle 50/oblong 51. A needle 53 is provided to control the position of the axle 50 in the oblong 51 in order to adjust the necessary force to close the knuckle mechanism. The position of the needle 53 is adjustable longitudinally along a complementary threading 54 and can be moved by means of screwdriver or a spanner. A coil 52 can be further provided to prevent the needle from unscrewing during use of the brewing device which would otherwise affect the closure force of the brewing device. According to the invention, the handle is not directly articulated to the rear axle 30 of the knuckle joint mechanism 23 but is linked to an intermediate force transmission means 31 whose function is to de-multiply the force from the handle to the knuckle joint mechanism. This mechanism is formed of at least two second pairs 32, 33 of rods 34, 35 connected respectively to each side of the handle and knuckle joint mechanism. Each pair of rods comprises an upper rod 34 linked via an upper free pivot axle 36 to the handle and a lower shorter rod 35 linked to the upper rod via an intermediate free pivot axle 37 and linked fixedly to knuckle joint mechanism 23 at a certain fixed angle B, e.g., of about 110-130 degrees.

Therefore, the movement of the handle 21 in rotation from the opening position (FIGS. 4-5) toward the closing direction (FIGS. 7-8 and finally FIGS. 8-9) will force transmission means 31 to fold at the intermediate pivot axle 37 therefore transferring a force to the knuckle joint mechanism that increases while the folding angle A of the means 31 diminishes. As a result, the force exerted by the force transmission means on the knuckle mechanism to pass the "hard point", between the intermediate positions of FIG. 7 to the closing position of FIG. 9, is higher than the force at the beginning of the closing operation (i.e., between the opening of FIG. 5 to the intermediate of FIG. 7). Comparatively also, The vertical displacement Δd2 of the knuckle joint mechanism at the end of the closing process, when passing from an open "V" shape to the inverted "V" shape (FIG. 9), is greatly smaller than the displacement Δd1 from the opened to the intermediate position (FIG. 7). The displacement Δd2 exerts itself along an operational angular range A2 of the handle that is still relatively important (FIG. 7). Therefore, the ratio of the rotation angle of the handle to the displacement of the knuckle joint mechanism (or in manner equivalent to the relative displacement of the holding portions) ΔA/Δd tends to increase as the handle is actuated down to the closing position.

Of course, the force transmission means could be replaced by equivalent means that may differ in their form but which exerts the same force demultiplying function (i.e., the same primary effect).

FIG. 10 refers to a variant of the brewing device regarding another aspect of the invention. The improvement lies in the water supply means to the capsule's brewing device. The water supply means 11 comprises a length compensatory tube portion 38 which is non-moveable relative to the frame whereas the rear holding portion 6 moves during opening and closing against the front holding part. The length compensatory tube portion is, for instance, a portion of tube which extends preferably rearwardly in a straight configuration. The tube can be flexible or semi-rigid but its rigidity should be determined to enable to the tube to insert itself in the holding portion 6 while the portion is opened (i.e., moved rearwardly) but not too rigid to avoid blocking the opening of the device.

On its front end 39, the portion of tube 38 can be mounted in sliding relationship in the holding portion 6. More particularly, the holding portion can include a tubular passage 40, such as a flared portion in a rigid sleeve. The connection of the front end 39 in the passage is a fluid-tight but sliding connection; therefore, necessitating one or more sealing elements 41 inserted in the interior of the passage such as o-rings and the like.

The rear end 42 of the compensatory portion of tube can be attached fixedly to a redirecting connecting portion 49 having the function to change the direction of the tube as needed. In the present case, the compensatory portion of tube 38 can be a rigid, hollow casing with an inlet 42 for receiving an upstream fluid supply tube 43 that brings the fluid from the water heater and an outlet 44 for receiving the rear attached end of the compensatory tube means. The casing can encompass the usual backpressure valve 45, if needed, which is normally provided further downstream of the water supply means, i.e., just before the brewing cavity. Proper sealing elements 46, 47, fittings 48, are provided for ensuring a proper fluid tight connection through the casing.

When the rear holding portion 6 is moved backwards, the compensatory portion of tube which is fixed by its rear end 42 but free by its front end 39 will insert itself in the passage and eventually in the brewing cavity 10. The front end of the portion can be reinforced with plastic, metal and/or fibres to improve its durability. The whole portion can also be made or reinforced in these materials. The end can also be slightly flared to improve the sealing effort in radial direction when back in place in sealing engagement with the passage for the water supply.

The front end 39 of the compensatory portion of tube 38 can protrude inside the internal cavity 10 of the holding part 6 when the holding part is moved backwards during re-opening of the brewing device. The compensatory portion of tube can thus help remove the capsule from the cavity. When the holding part 6 is moved backwards, the capsule may still be in engagement by the piercing elements 12 thus causing the capsule to remain stuck in the cavity. Therefore, the compensatory portion of tube can push the capsule to become disengaged from the piercing elements as the holding part is sliding backwards.

Another possible mode of the invention is now described in relation to FIGS. 11 to 16.

The device comprises a main frame 60 which can be composed of a left frame portion 61, a right frame portion 62, an upper frame portion 63 (e.g., for stability) and a front beverage outlet portion 64.

The frame can be manufactured in full plastic or metal or a combination of plastic and metal. The portions can be made of injected or extruded pieces.

The device in FIGS. 11 to 13 comprises two holding members, respectively a first and second holding members 65, 66; which are positioned in spaced apart relationship in the open position of FIG. 12 for enabling insertion of a capsule 9 in the device.

According to an aspect of the invention, a capsule retaining member 67 is provided in the open gap between the holding members to receive and guide the capsule in its descent and hold it in a pre-position in the brewing device. The retaining member 67 is arranged to maintain the capsule during closing of the brewing device and allow the capsule's ejection during re-opening of the brewing device.

A detailed description of the principle for holding and ejecting the capsule in the brewing device is given in co-pending European patent application filed on the same day as the present application and entitled: "Brewing device with a capsule holder for facilitating insertion and removal of capsule".

In the disclosed embodiment, the first holding member is slidably mounted along the frame, i.e., the two side portions 65, 66 to be capable of reciprocating along a substantially longitudinal median axis I. The second holding member 66 is placed in the frame in a non-movable position, i.e., fixed position. Therefore, for closure of the holding members 65, 66 about the capsule 67, the first holding member 65 is forced to come closer to the second holding member 66 up to a position where it can form a fluid tight engagement with the second holding member in the closed position of FIG. 13.

According to an aspect of the invention, the brewing device has a closing mechanism 68 comprising an actuation member 69 and force transmission means 70 which transfer the force exerted by or on the actuation member 69 to the first holding member. The actuation member 69 can be a manual lever. The lever transfers torque as applied by the user directly to the force transmission means 68. The force transmission means comprises spur gear means which are designed to transfer the torque of the lever into translation forces to the holding member 65.

More particularly, the spur gear means 70 consists of a pair of gears 71, 72 which engage into intermeshing and are connected in rotation to the frame, i.e., the left and right portions 61, 62 of the frame, respectively to a rear axle 73, and front axle 74. The rear gear 71 represents the master gear receiving the torque of the lever and which forces the front gear or slave gear 72 in rotation. The front gear 72 is connected to rod means 75 at a pivot point 76 transversally mounted on the front gear which is offset from the axial centre 74 of the front gear. The rod means 75 may be a pair of side rods connected respectively to the front gear 72 via said pivot point 76 and to the first holding member 65 via a front pivot point 77. As a result of the angular course on the lever, e.g., a course of about 90 degrees, the gears are driven in rotation thereby transferring translational forces via the rod means 75 onto the first holding member 65. The rod means and the front gear forms a knuckle joint means that fold at pivot point 76. Furthermore, according to a preferred mode, the spur gear means are designed to provide a variable transmission rate. The rate of transmission expresses the ratio between the entry speeds of the master gear and the exit speed of the slave gear as illustrated in FIG. 16. The rate of transmission is directly obtained by the ratio of the radiuses (r1/r2) at the pitch point. According to the invention, the ratio of radiuses, r1/r2, varies progressively during the angular courses of the gear means, consequently, also during the angular course of the lever, therefore, providing a variable exit speed on the slave gear which is transferred as a variable translational closure speed onto the first holding member.

Preferably, the spur gear is designed such that the transmission rate provides progressively increasing output torque and conversely a decreasing rotational output speed. This increasing output torque transfer increasing translational forces onto the first holding member and conversely a reduction of the speed of closure of the first holding member toward the second holding member.

Therefore, higher closure forces are delivered when they are desired the most, i.e., at the end of the closure motion. The modification of the output forces are also obtained without significantly modifying the input force exerted on the lever; therefore, facilitating manual closure of the device.

For this, the radius r1 (at the intermeshing point) of the master gear becomes smaller and the radius r2 (at the intermeshing point) of the slave gear becomes greater during the angular course of the closing mechanism toward the direction of closure (Direction A in FIG. 16). The relation is such that r1 is greater than r2 at the beginning of the closure motion and r1 is smaller than r2 at the end of the closure motion.

For instance, the transmission rate r1/r2 can vary of from 5:1 to 1:5.

In order to obtain variable transmission rates, the gears can have a non-circular transversal section with a longer longitudinal axis and a shorter transversal axis.

For instance, the gears have an ellipsoidal transversal section. For this, each spur gear has a longer transversal radius. The respective longer transversal radiuses of the spur gears are thus positioned at about 90 degrees one another.

FIGS. 14 and 15 illustrate respectively the open state and the closing state of the device. In the open state, the lever 69 is substantially positioned in upright position and the first holding member 65 is distant from the second (fixed) holding member 66. The radius r1 of the master gear is maximal whereas the radius r2 of the slave gear is minimal. At least one of the gears, e.g., the slave gear may also comprise a inward curvature in the region of its smaller dimension in order to reduce the distance between the pivot points and have a more compact design. When the lever is actuated down for closing the device, the transmission rate will vary causing a progressive increasing force and a deceleration of the closing speed at the holding member. At the end of the angular course of the lever (FIG. 15), i.e., about a 90-degree angular path, the transmission rate of the gear means is inverted and the force becomes maximal and so the speed becomes minimal.

The brewing device further comprises an ejection assisting means 78 in the form of a punch applying an ejection force to unstick the capsule from the internal surface of the first holding member. The capsule can remain stuck to the surface, for example, by the perforating elements being engaged in the capsule. Therefore, the ejection assisting means 78 is coordinated with the opening of the holding members about the capsule to ensure that it applies the ejection force as the holding member re-opens. For this, the ejection assisting means is guided by the gear means. The punch of the ejection assisting means has a rear end directly engaged by the slave gear and is pushed in translation by the gear.

The invention claimed is:

1. A brewing device for the brewing of a capsule containing a beverage ingredient comprising:
    a main frame,
    a first capsule holding part,
    a second capsule holding part for at least partially holding the capsule, with the second capsule holding part being mobile relative to the first capsule holding part in the frame and linked to the frame by a closing mechanism comprising knuckle joint means to move the entire second capsule holding part linearly from an open position at which the two capsule holding parts are distant one another to enable the insertion of the capsule between the two parts and a closed position at which the first and second holding parts are closed about the capsule; and
    a manual handle forming a lever to activate via the closing mechanism the second holding part from the open position to the closed position and vice versa,
    wherein the closing mechanism comprises additional force transmission means associated with the handle and arranged to de-multiply the force applied by the handle on the knuckle joint means that compensates for the increase of the force needed for closing the holding parts on the capsule, and
    wherein the frame includes an open channel in which the second capsule holding part reciprocates linearly between the open and closed positions.

2. The brewing device according to claim 1, wherein the additional force transmission means is configured to link the handle to the knuckle joint means.

3. The brewing device according to claim 2, wherein the additional force transmission means comprises force levers for applying a demultiplication of the force of the handle to the knuckle joint means during closure.

4. The brewing device according to claim 1, wherein the knuckle joint means comprises a pair of two rods; one end of each of which being connected to the second holding part, the other end of each of which being connected to the additional force transmission means.

5. The brewing device according to claim 1, wherein the handle is attached to the upper of the frame.

6. The brewing device according to claim 5, wherein the handle is shorter in length than the length of the assembly formed by the second holding part and the knuckle joint means when extended in the closing position.

7. The brewing device according to claim 1, wherein the second holding part is arranged to slide in a substantially linear direction within the frame.

8. The brewing device according to claim 1, which further comprises a passage adapted for the positioning of the capsule between the two holding parts.

9. The brewing device according to claim 8, which further comprises a capsule retaining means provided between the two holding parts to retain the capsule in a predefined position before closure.

10. A brewing for the brewing of a capsule containing a beverage ingredient comprising:
    a main frame,
    a first capsule holding part,
    a second capsule holding part for at least partially holding the capsule, with the second capsule holding part being mobile relative to the first capsule holding part in the frame and linked to the frame by a closing mechanism comprising knuckle joint means to move from an open position at which the two parts are distant one another to enable the insertion of the capsule between the two parts and a closed position at which the first and second holding parts are closed about the capsule; and
    a manual handle forming a lever to activate via the closing mechanism the second holding part from the open position to the closed position and vice versa,
    wherein the closing mechanism comprises additional force transmission means associated with the handle and arranged to de-multiply the force applied by the handle on the knuckle joint means that compensates for the increase of the force needed for closing the holding parts on the capsule; and
    wherein the additional force transmission means is formed of at least a pair of connecting rods each attached to the handle on one end and to the knuckle joint means on the other end.

11. The brewing device according to claim 10, wherein the force transmission means is configured in relation to the handle and knuckle joint means to increase the ratio of the angular course of the handle to the closure course of the at least second holding part when the handle is actuated in the closure direction.

12. The brewing device according to claim 11, wherein the at least 40 last degrees of the course or the handle is utilized to displace the course of the knuckle joint means by less than about the last 20%.

13. A brewing for the brewing of a capsule containing a beverage ingredient comprising:
    a main frame,
    a first capsule holding part,
    a second capsule holding part for at least partially holding the capsule, with the second capsule holding part being mobile relative to the first capsule holding part in the frame and linked to the frame by a closing mechanism comprising knuckle joint means to move from an open position at which the two parts are distant one another to enable the insertion of the capsule between the two parts and a closed position at which the first and second holding parts are closed about the capsule; and
    a manual handle forming a lever to activate via the closing mechanism the second holding part from the open position to the closed position and vice versa,
    wherein the closing mechanism comprises additional force transmission means associated with the handle and arranged to de-multiply the force applied by the handle on the knuckle joint means that compensates for the increase of the force needed for closing the holding parts on the capsule; and wherein the force transmission means comprises gear means able to transfer the torque provided by the handle into translational closure forces on the first capsule holding part, and wherein the gear means comprises a pair of spur gears having non-circular transversal sections.

14. The brewing device according to claim 13, wherein each spur gear has a longer transversal radius and wherein the respective transversal radiuses are positioned at about 90 degrees from one another.

15. A brewing unit for the brewing of a capsule containing beverage ingredients comprising:

a frame, first and second capsule holding members for at least partially enclosing the capsule during brewing, wherein the first holding member is mobile along the frame between open and closed positions with relation to the second holding member; and a closing mechanism to actuate the first holding member between the two positions comprising an actuation member, wherein the closing mechanism comprises gear means able to transfer the torque provided by the actuation member into translational closure forces on the first holding member;

wherein the gear means includes spur gears arranged so that the transmission rate varies progressively during rotation; and wherein the actuation member is a handle.

16. The brewing device according to claim 15, wherein the gear means comprises a pair of spur gears having non-circular transversal sections.

17. The brewing device according to claim 16, wherein each spur gear has a longer transversal radius and wherein the respective transversal radiuses are positioned at about 90 degrees from one another.

18. A brewing for the brewing of a capsule containing a beverage ingredient comprising:

a frame, first and second capsule holding members for at least partially enclosing the capsule during brewing, wherein the first holding member is mobile along the frame between open and closed positions with relation to the second holding member; and a closing mechanism to actuate the first holding member between the two positions comprising an actuation member, wherein the closing mechanism comprises gear means able to transfer the torque provided by the actuation member into translational closure forces on the first holding member;

wherein the gear means comprises a pair of spur gears having non-circular transversal sections.

19. The brewing device according to claim 18, wherein each spur gear has a longer transversal radius and wherein the respective transversal radiuses are positioned in intermeshing relationship at about 90 degrees from one another.

20. A brewing device for the brewing of a capsule containing a beverage ingredient comprising:

a main frame, a first capsule holding part, a second capsule holding part for at least partially holding the capsule, with the second capsule holding part being mobile relative to the first capsule holding part; and water supply means connected to second holding part configured to inject water in the said part, wherein the water supply means comprises a length compensatory tube portion which is fixed relatively to the frame, whereas the second holding part can move with respect to the compensatory tube portion such that the compensatory tube portion extends into the second holding part.

21. The brewing device according to claim 20, wherein the compensatory tube portion is mounted relatively to the second holding part so that it inserts itself at least partly in the holding part as the holding part moves to the open position.

22. The brewing device according to claim 21, wherein the compensatory tube portion slides at least partially in a passage of the capsule holding part as said holding part moves toward its opening position.

23. The brewing device according to claim 20, wherein the second holding part include a passage surrounding at least part of the compensatory tube portion and further comprising sealing means which prevent water injected from the tube from bypassing entry into the second holding part.

* * * * *